United States Patent [19]

Mason

[11] 4,402,548

[45] Sep. 6, 1983

[54] SAFETY SEATS FOR VEHICLES

[75] Inventor: Stuart V. Mason, Biggleswade, England

[73] Assignee: Britax-Excelsior Limited, England

[21] Appl. No.: 235,649

[22] Filed: Feb. 18, 1981

[30] Foreign Application Priority Data

Feb. 27, 1980 [GB] United Kingdom ................. 8006516

[51] Int. Cl.³ ........................ A47C 31/00; B60R 21/00
[52] U.S. Cl. .................................... 297/464; 297/216; 297/250; 297/484
[58] Field of Search ............... 297/467, 464, 484, 254, 297/255, 256, 250, 216

[56] References Cited

U.S. PATENT DOCUMENTS

| | | | |
|---|---|---|---|
| 3,596,986 | 8/1971 | Ragsdale | 297/467 X |
| 3,934,934 | 1/1976 | Farrell, Jr. et al. | 297/467 |
| 4,047,755 | 9/1977 | McDonald et al. | 297/464 X |
| 4,186,961 | 2/1980 | Farrell, Jr. et al. | 297/467 X |
| 4,190,287 | 2/1980 | Lemisch et al. | 297/467 |
| 4,234,228 | 11/1980 | Flamm | 297/464 |

*Primary Examiner*—James T. McCall
*Attorney, Agent, or Firm*—Hayes, Davis & Soloway

[57] ABSTRACT

A safety seat for a vehicle of the type comprising a shell 10 forming a seat portion 12 a back portion 14 and two side portions 16 and 18, which are covered by a fabric seat cover 50, is made adjustable in width by providing a plurality of filler strips 54, 56 which fit between the cover 50 and the side portions 16 and 18 of the shell so as to adjust the interior width of the seat. Lateral head restraint pads 58 and 60 may also be provided. The seat is particularly suitable for use by a growing physically handicapped child who requires lateral support when seated in a motor vehicle at an age when his contemporaries are capable of sitting in a vehicle without such support.

4 Claims, 2 Drawing Figures

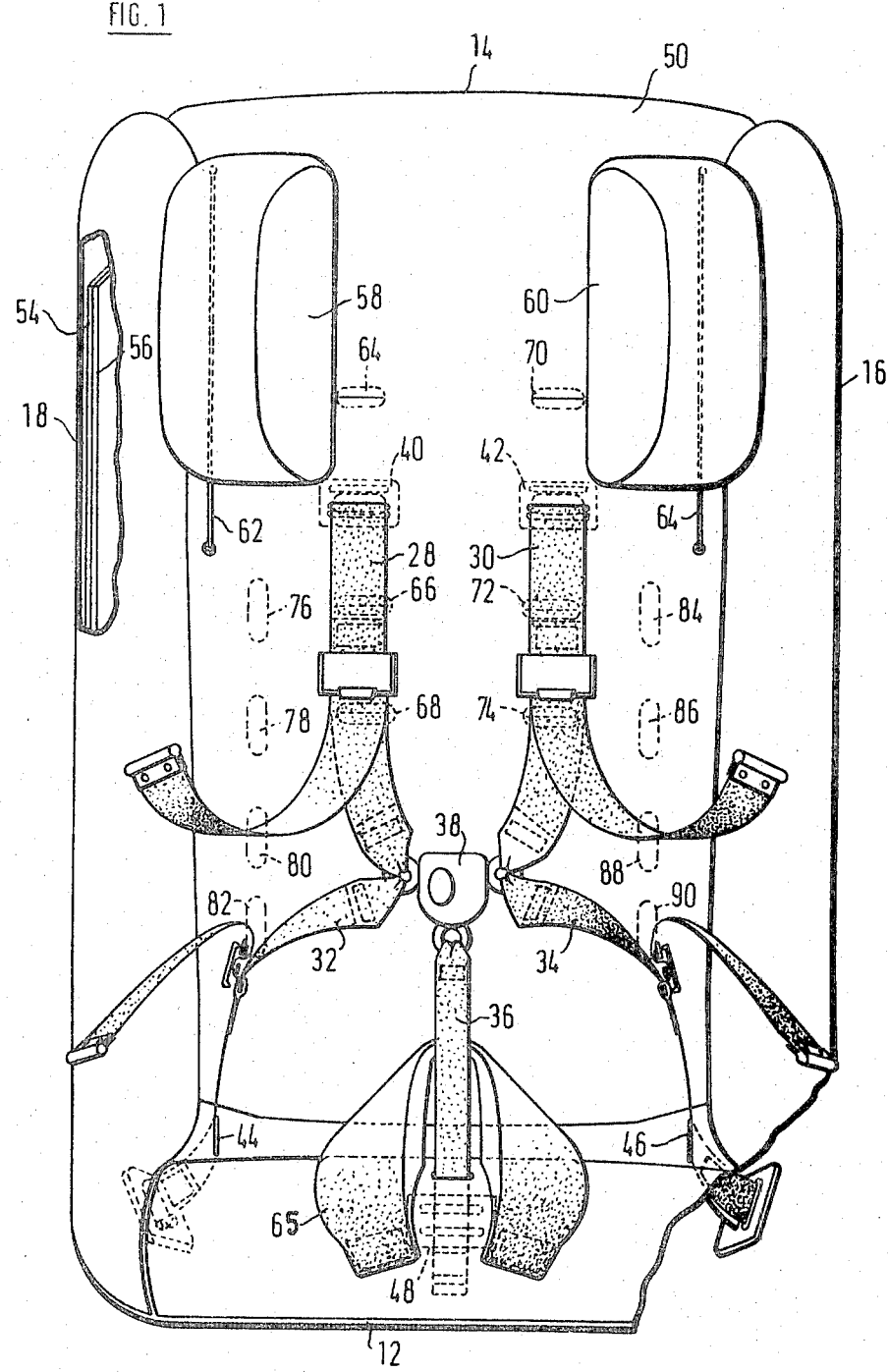

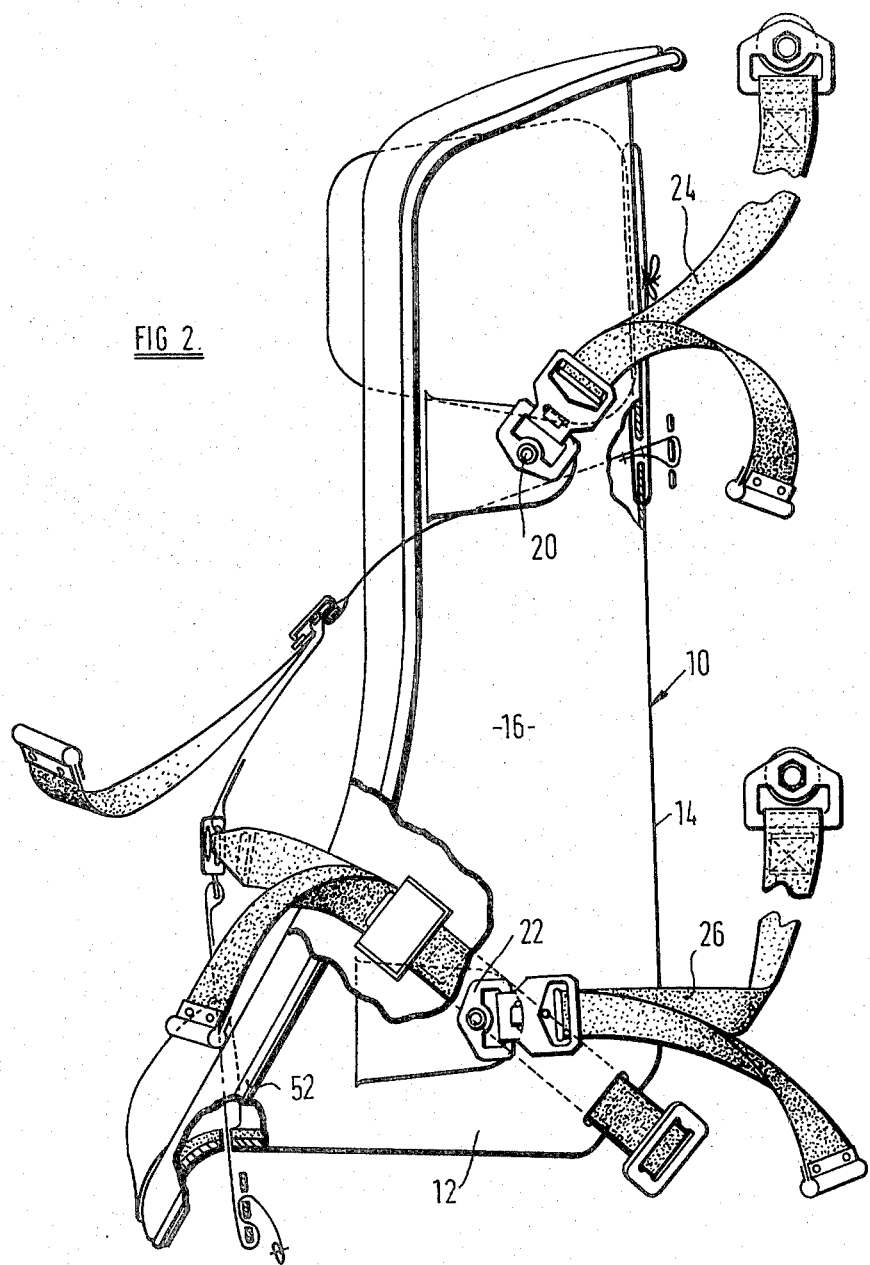

SAFETY SEATS FOR VEHICLES

This invention relates to safety seats for vehicles and has particular application to the provision of a safety seat for use by the physically handicapped.

Persons suffering from certain physical handicaps, particularly muscular disabilities, have difficulty in supporting themselves in a conventional car seat. A similar problem is encountered with young children and it is already known to provide a child's safety seat in the form of a moulded shell which provides lateral support for the child's body as well as having a seat portion and a back portion. A child's safety seat of this type is described in U.K. Specification No. 954816.

Child's safety seats of the foregoing type are provided in a single size. When a normal child has grown out of such a safety seat, his physical development has reached the stage at which he is capable of supporting himself in a conventional vehicle seat. The present invention is concerned with the provision of a safety seat, the effective size of which can be adjusted so as to accommodate a growing handicapped child and to fit handicapped adults of differing build.

According to the invention, a kit of parts for forming a safety seat for a vehicle comprises a shell having a seat portion, a back portion and two side portions, each side portion extending between the respective edge of the seat portion and a corresponding edge of the back portion, a fabric seat cover shaped to fit within the shell, means for detachably securing the edge of the cover to the edge of the shell, and a set of filler strips, each adapted to fit between the cover and the shell whereby the interior size of the seat is adjustable by varying the number of superimposed filler strips.

Preferably the means for securing the edge of the cover to the edge of the shell comprises metal beading of 'U' shaped cross section which is sewn into the edge of the cover and which can be bent to grip the edge of the shell.

In one form of the invention, the seat is provided with head restraint pads which are detachably mounted on the cover against the back portion and which abut against the top parts of the filler strips on each side of the seat. Consequently variation of the number of filler strips adjacent to the side portions of the shell has the additional effect of varying the space between the head restraint pads.

The safety seat is preferably provided with a full harness having two shoulder straps and two hip straps fastened by a centrally located buckle. Additionally, a crotch strap can be provided together with a crotch pad, the operative width of which can be adjusted for use when it is desired to prevent the seat occupant from inadvertently crossing his legs.

An embodiment of the invention is illustrated in the accompanying drawings in which:

FIG. 1 is a partially broken away front view of a safety seat, and

FIG. 2 is a side view of the safety seat shown in FIG. 1.

Referring to the drawings, a safety seat comprises a shell 10 moulded from resin-impregnated glass fibre material.

The shell has a seat portion 12, a back portion 14 and two side portions 16 and 18. Attached to each of the side portions 16 and 18 are respective upper and lower anchorage points 20 and 22 for straps 24 and 26 whereby the seat may be secured to a vehicle in a similar manner to that which is used for child's safety seats.

The seat is fitted with a harness comprising shoulder straps 28 and 30 and lap straps 32 and 34 and a crotch strap 36 which are interconnected by a centrally positioned buckle 38. The shoulder straps 28 and 30 are fixed through anchorage slots 40 and 42 on the back portion 14, the lap straps 32 and 34 to anchorage slots 44 and 46 at the junction between the back portion 14 and the seat portion 18, and the crotch strap 36 to an anchorage slot 48 on the seat portion 12. The inner surface of the shell 10 is covered by a fabric seat cover 50 which has slots through which the straps 28, 30, 32, 34 and 36 project.

The fabric seat cover 50 has a 'U' shaped metal beading 52 sewn into its edge. The metal beading 52 is made of a material which can be manually compressed so that it takes up a permanent set in which it grips the edge of the shell 10. The fabric of the cover 50 is sufficiently stretchable to enable the beading to be pulled off the edge of the shell 10 so that, with the cover folded back, the inside faces of the side portions 16 and 18 of the shell are accessible. In accordance with the invention, one or more polystyrene filler strips is inserted into the space thus exposed. FIG. 1 shows two such filler strips 54 and 56 which extend substantially from the top to the bottom of the side portion 18. Similar strips (not shown) are provided on the other side of the seat. Thus the interior width of the seat can be adjusted by varying the number of filler strips inserted.

Two head restraint pads 58 and 60, which serve to restrain lateral movement of the seat occupant's head, are slideably mounted on respective laces 62 and 64 which project through holes in the seat back portion 14. The outer sides of the pads 58 and 60 engage with the side portions of the seat cover so that their lateral positions are determined by the number of filler strips, such as 54 and 56, which have been inserted. Touch-and-close fasteners (not shown), of the type sold under the Registered Trade Mark "Velcro", are provided to hold the pads 58 and 60 in their desired positions.

A flexible crotch pad 65 extends round the crotch strap 36 and has its ends secured to the part of the cover which extends over the seat base by means of touch-and-close fasteners. The pad 62 serves to prevent a seat occupant, who has only limited control over the muscles of his legs, from inadvertently crossing them and thereby developing sores. It may be removed if not required.

Additional anchorage slots 64, 66, 68 and 70, 72, 74 are provided above and below the slots 40 and 42 to provide alternative anchorage points for the shoulder straps 28 and 30 for use in accordance with the height of the occupant's shoulders. Further anchorage slots, such as the slots 76 to 90 may be provided, if desired, to serve as anchorage points for additional straps if the standard hardness is inadequate to cope with a particular occupant's handicap. The invention accordingly provides a safety seat for a handicapped person, the size of which can readily be adjusted to suit the individual occupant. As an alternative, the tops of the filler strips 54 and 56 may be below the level of the head restraint pads 58 and 60. The number of filler strips then has no effect on the spacing between the head restraint pads.

I claim:

1. A kit of parts for forming a safety seat for a vehicle comprising a shell, a fabric seat cover means for detachably securing the edge of the cover to the edge of the shell, and a set of filler strips, the shell having a seat portion, a back portion and two side portions, each side portion extending between the respective edge of the seat portion and a corresponding edge of the back portion, the seat cover being shaped to fit within the shell and each filler strip being adapted to fit between the cover and a side portion of the shell whereby the interior width of the seat is adjustable by varying the number of superimposed filler strips.

2. A kit of parts according to claim 1, wherein the means for securing the edge of the cover to the edge of the shell comprises metal beading of U-shaped cross section which is sewn into the edge of the cover and which is bendable to grip the edge of the shell.

3. A kit of parts according to claim 1, further comprising head restraint pads which are detachably mounted on the cover against the back portion and which abut against the top parts of the filler strips on each side of the seat.

4. A kit of parts according to claim 1, including a harness having a crotch strap and a crotch pad of adjustable operative width.

* * * * *